Oct. 24, 1933.　　　　E. H. PERKINS ET AL　　　　1,931,803
TRANSPORTATION OF AUTOMOBILES
Filed June 30, 1933　　　2 Sheets-Sheet 1
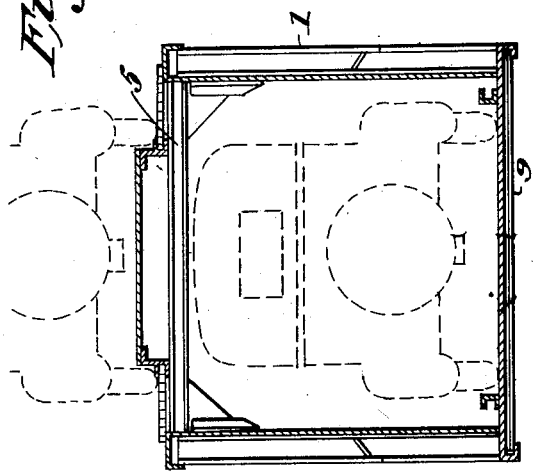
INVENTORS
Edward H. Perkins
BY Hubert E. Mills
Thomas Griswold Jr. & E. C. Burdick
ATTORNEYS Oct. 24, 1933.  E. H. PERKINS ET AL  1,931,803
TRANSPORTATION OF AUTOMOBILES
Filed June 30, 1933   2 Sheets-Sheet 2
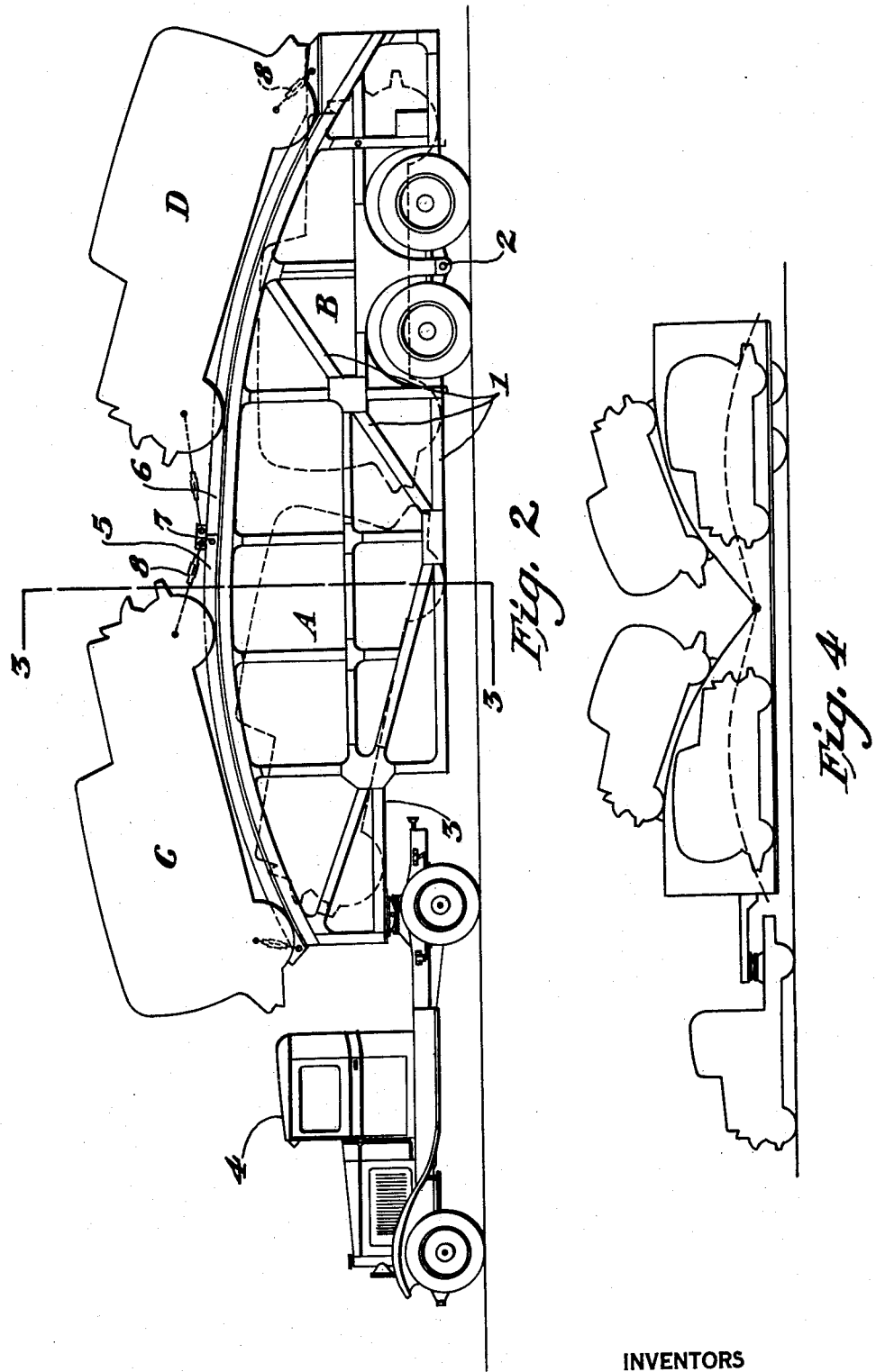
INVENTORS
Edward H. Perkins
BY Hubert E. Mills
Thomas Griswold Jr. & E. C. Burdick
ATTORNEYS Patented Oct. 24, 1933

1,931,803

UNITED STATES PATENT OFFICE 1,931,803

TRANSPORTATION OF AUTOMOBILES

Edward H. Perkins and Hubert E. Mills, Midland, Mich., assignors to The Dow Chemical Company, Midland, Mich., a corporation of Michigan Application June 30, 1933. Serial No. 678,340

3 Claims. (Cl. 280—33.1)

The invention relates to methods of arranging automobiles upon a vehicle adapted to their transport, such as a highway trailer or a rail-road car.

It is an object of the invention to provide a method of arranging automobiles for transportation in such manner that they can be carried in considerably less over-all space than is possible with heretofore known methods. The term "automobile" is used in its broad sense and includes passenger cars, trucks, chassis with cab, etc.

To the accomplishment of the foregoing and related ends, the invention, then, consists of the method hereinafter fully described and particularly pointed out in the claims, the annexed drawings and the following description setting forth in detail certain methods of carrying out the invention, such disclosed methods illustrating, however, but several of the various ways in which the principle of the invention may be used.

In said annexed drawings:—

Figure 1 is a diagrammatic side sectional elevation illustrating our preferred method of arranging four automobiles upon a trailer.

Figure 2 is a side elevation of one form of trailer loaded according to the invention.

Figure 3 is a sectional elevation taken on the line 3—3 on Figure 2.

Figure 4 is a diagrammatic side sectional elevation illustrating an alternative method of placing automobiles upon a trailer.

Our method of arranging four automobiles for transportation on a vehicle comprises placing the automobiles in such manner that they may be carried in substantially the length of two automobiles and considerably less than twice the normal height of one automobile. This is accomplished by placing two automobiles end-to-end, and placing another automobile substantially above each of the first two automobiles in such manner that the set of wheels at the end of the higher portion of the upper automobile extends below the top level of the higher portion of the automobile therebelow. By higher portion of an automobile is meant that portion which requires the greater clearance height, i. e. the cab end of a truck, and the rear end of a passenger automobile.

Our preferred arrangement of the automobiles is such that two are placed end-to-end with the higher portions of each adjacent, and then two other automobiles are placed end-to-end substantially over the first two automobiles with their lower portions adjacent, in such manner that the set of wheels at the end of the higher portion of each of the upper automobiles extends below the top level of the higher portion of the automobiles therebelow.

Referring to the drawings, Figure 1 illustrates diagrammatically our above-described preferred form of arranging four automobiles on a vehicle adapted for the transport thereof.

In Figure 2, the side member 1 is carried upon an axle 2 between tandem wheels. The member 1 has at its lower forward end a raised portion 3 adapted to be supported upon the framework of a tractor 4. This side member 1 supports the lower floor of the trailer upon which the lower two automobiles are carried. A curved upper cover member 5 supported by the side member 1 constitutes an upper floor upon which the two upper automobiles are loaded. The upper floor is depressed at its ends with respect to the center, and the rear section 6 thereof is hinged at the point 7 so that it can be swung upward to permit automobiles A and B to be moved upon the lower floor. As shown, the automobile A is placed with its higher portion toward the center of the vehicle, and with the wheels at the end of its lower portion elevated with respect to the wheels at the end of its higher portion. The automobile B is placed with its higher portion endwardly adjacent the higher portion of the automobile A. After these automobiles are in position, the movable section 6 is then lowered to form a portion of the upper floor upon which automobiles C and D are rolled and fastened in position by suitable means 8.

It is quite evident that the automobile C may be placed upon the vehicle prior to the placing of the automobiles A and B, followed by placing the automobile D thereon in the same manner as above recited. Also, it is obvious that the automobile A can be placed in position, then the automobile C, then the automobile B, and lastly the automobile D, without departing from the spirit of the invention. Both of the foregoing alternative procedures accomplish the same result as does the procedure described in detail in the preceding paragraph.

Figure 3 is a cross sectional elevation through Figure 2 on the line 3—3. This shows the side members 1 and the lower floor 9 carried thereby. The drawings also show the cover member 5.

Figure 4 illustrates an arrangement of four automobiles differing from our preferred arrangement shown in Figure 1 in that the higher portions of the lower automobiles are at opposite ends of the trailer, necessitating a rearrangement of the upper automobiles to bring the higher portions thereof together.

It is apparent from the foregoing description that our invention provides a method of arranging automobiles upon a suitable trailer which makes possible the carrying of the same in a minimum of length and height.

Other modes of applying the principle of our invention may be employed instead of those explained, change being made as regards the means herein disclosed, provided the method stated by any of the following claims or the equivalent of such stated method be employed.

We therefore particularly point out and distinctly claim as our invention:—

1. In a method of loading automobiles on a vehicle for their transport the steps which consist in first placing at the forward end of the vehicle an automobile with its higher portion toward the center of the vehicle and with the set of wheels at the end of its lower portion elevated with respect to the set of wheels at the end of its higher portion, then placing upon the vehicle a second automobile with its higher portion endwardly adjacent the higher portion of the first automobile, then passing a third automobile over said second automobile into a position above said first automobile with the set of wheels at the end of the higher portion of said third automobile extending below the top level of the higher portion of said first automobile, and then placing a fourth automobile above said second automobile with the set of wheels at the end of the higher portion of said fourth automobile extending below the top level of the higher portion of said second automobile.

2. In a method of loading automobiles on a vehicle for their transport, the steps which consist in first placing at the forward end of the vehicle an automobile with its higher portion toward the center of the vehicle and with the set of wheels at the end of its lower portion elevated with respect to the set of wheels at the end of its higher portion, then placing upon the vehicle a second automobile substantially above said first automobile with the set of wheels at the end of the higher portion of said second automobile extending below the top level of the higher portion of said first automobile, then placing upon the vehicle a third automobile with its higher portion endwardly adjacent the higher portion of the first automobile, and then placing a fourth automobile substantially above said third automobile with the set of wheels at the end of the higher portion of said fourth automobile extending below the top level of the higher portion of said third automobile.

3. In a method of loading automobiles on a vehicle for their transport, the steps which consist in first placing in an elevated position at the forward end of the vehicle an automobile with its lower portion toward the center of the vehicle and with the set of wheels at the end of the higher portion of the automobile depressed with respect to the set of wheels at the end of the lower portion of the automobile, then placing at the forward end of the vehicle substantially below said first automobile a second automobile with its higher portion toward the center of the vehicle and with the set of wheels at the end of its lower portion elevated with respect to the set of wheels at the end of its higher portion and with a part of its higher portion extending above the bottom level of the set of wheels at the end of the higher portion of the said first automobile, then placing upon the vehicle a third automobile with its higher portion endwardly adjacent the higher portion of the said second automobile, and then placing a fourth automobile substantially above said third automobile with the set of wheels at the end of the higher portion of said fourth automobile extending below the top level of the higher portion of said third automobile.

EDWARD H. PERKINS.
HUBERT E. MILLS.